United States Patent
Cummins

(10) Patent No.: US 7,248,008 B1
(45) Date of Patent: Jul. 24, 2007

(54) SHADED-POLE A.C. MOTOR WITH DYNAMIC BRAKE

(76) Inventor: Michael D. Cummins, 2869 Long Lake Dr., Titusville, FL (US) 32780

( * ) Notice: Subject to any disclaimer, the term of this patent is extended or adjusted under 35 U.S.C. 154(b) by 33 days.

(21) Appl. No.: 11/251,646

(22) Filed: Oct. 17, 2005

(51) Int. Cl.
*H02P 3/00* (2006.01)

(52) U.S. Cl. .................. 318/377; 318/375; 318/759; 310/172

(58) Field of Classification Search ............ 318/377, 318/375, 473, 759; 310/172
See application file for complete search history.

(56) References Cited

U.S. PATENT DOCUMENTS

| | | | | |
|---|---|---|---|---|
| 3,731,149 | A * | 5/1973 | Sherman et al. | 361/4 |
| 3,997,827 | A * | 12/1976 | Pajak et al. | 318/761 |
| 4,450,397 | A * | 5/1984 | Painter et al. | 318/762 |
| 5,444,317 | A * | 8/1995 | Anderson et al. | 310/77 |
| 5,994,860 | A * | 11/1999 | Krueger et al. | 318/527 |
| 6,094,023 | A * | 7/2000 | Ericsson | 318/362 |
| 6,906,493 | B1 * | 6/2005 | Ramirez et al. | 318/751 |

* cited by examiner

*Primary Examiner*—Rita Leykin
(74) *Attorney, Agent, or Firm*—Sanchelima & Assoc.

(57) ABSTRACT

Am improved shaded pole A.C. motor with dynamic brake that includes a secondary high resistance winding that is selectively connected to a D.C. source when the A.C. voltage is removed. To stop a motor the A.C. voltage applied to the motor is removed with tandem switches that apply the D.C. voltage immediately upon removal of the A.C. voltage or the D.C. voltage can be selectively applied subsequently. The brake winding produces a magnetic flux in the same core where the main stator winding produces the magnetic flux responsible for causing the rotor to move. The brake winding can be connected in parallel during the time the A.C. voltage is applied to increase of the combined windings' inductance (resulting in an overall higher torque) and/or in series when during the braking operation when the D.C. voltage is applied to increase the combined winding's resistance (limiting further the peak D.C. current or reducing the secondary winding size). Relays are used in the preferred embodiment to implement the switching functions, which require arc-suppressing circuitry. More expensive active solid-state switches can be used obviating the need for the arc suppressing circuitry. The improved shaded pole A.C. motor is capable of running and stopping, like other motor types, with a relatively simple dynamic brake circuit compatible with these inexpensive motors.

7 Claims, 4 Drawing Sheets the following description, when read in conjunction with the accompanying drawings in which:
SHADED-POLE A.C. MOTOR WITH DYNAMIC BRAKE

BACKGROUND OF THE INVENTION

1. Field of the Invention

The present invention relates to a shaded-pole A.C. motor, and more particularly, to such a motor that includes a dynamic brake.

2. Description of the Related Art

Shaded-pole A.C. motors are widely used for low cost applications where high torque is not required. To stop these motors, a dynamic brake such as the ones used in other types (split capacitor, etc.) of A.C. motors is not feasible. The dynamic brakes typically involve the application of a D.C. current through to stator's winding to stop the rotor's rotation. However, the low resistance of the stator's winding would cause a high D.C. current to go through deteriorating, or even possibly destroying, the stator's winding. The inventor herein found a solution by including a secondary or brake coil with a relatively higher resistance to permit the safe application of the braking D.C. voltage.

SUMMARY OF THE INVENTION

It is one of the main objects of the present invention to provide a dynamic brake for shaded-pole A.C. motors.

It is another object of this invention to provide a dynamic brake for shaded-pole A.C. motors that permits a user to turn on and stop the motor continuously.

It is yet another object of this invention to provide such a dynamic brake for shaded-pole A.C. motor that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
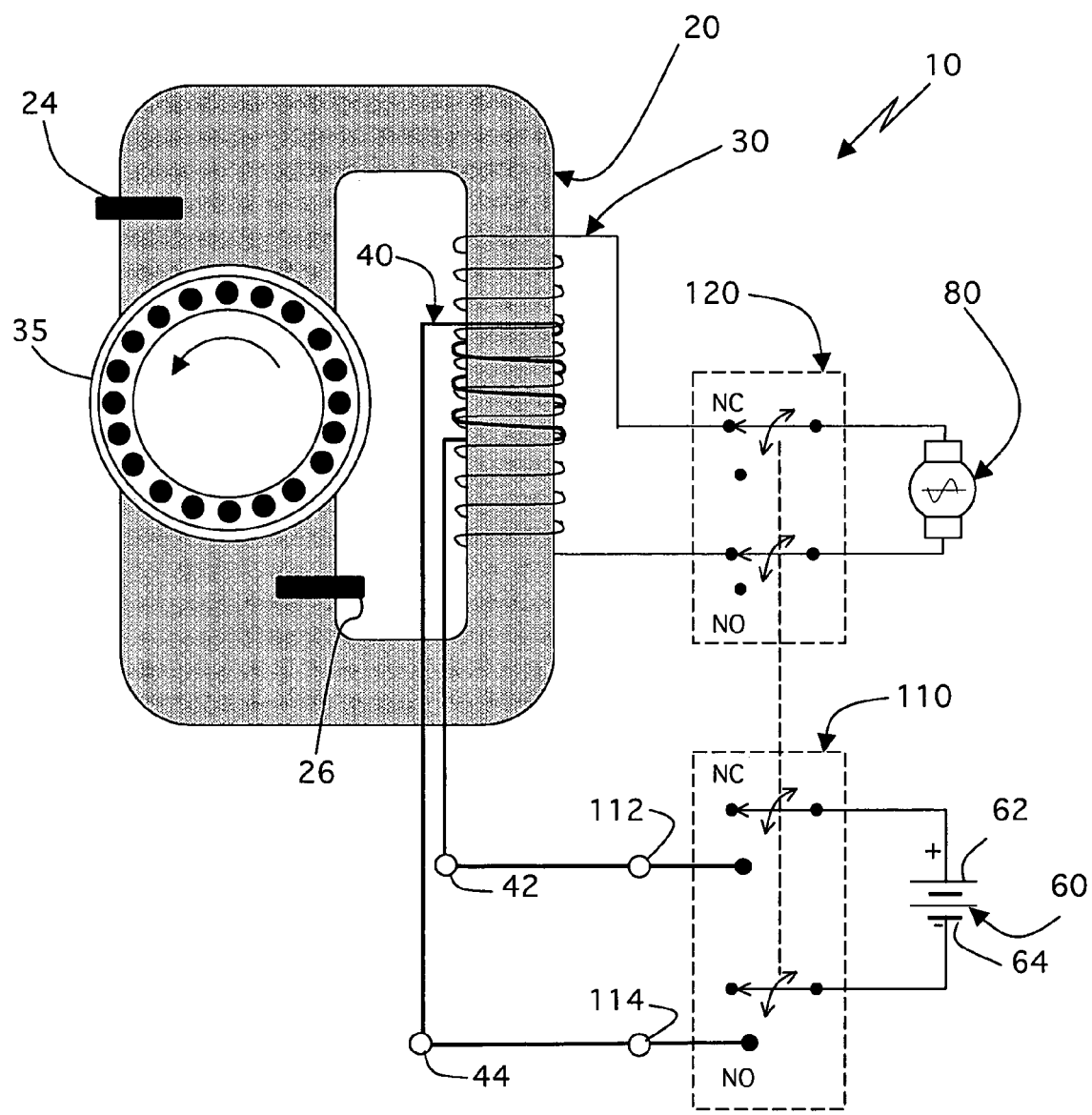
FIG. 1 represents a simplified schematic of the circuit used in the preferred embodiment of the invention where the D.C. source (disconnected) has been represented with a battery and an A.C. voltage is applied to the stator winding.

Referring now to the drawings, where the present invention is generally referred to with numeral 10, it can be observed that it basically includes stator core 20 with stator winding 30, shaded coils 24 and 26 and rotor 35 typical of shaded-pole motors.

Figure 2:
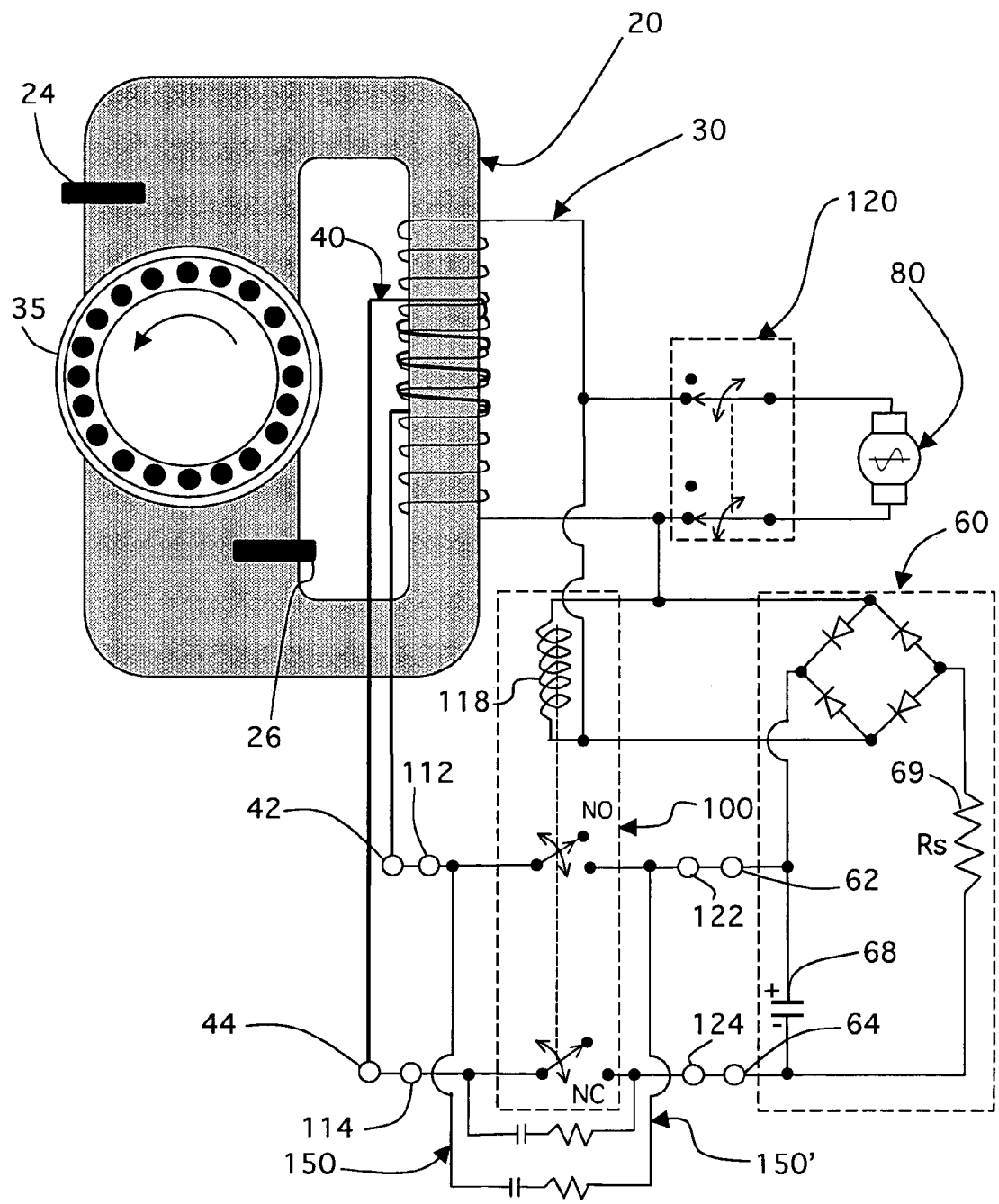
FIG. 2 is a schematic of the circuit in FIG. 1 where the D.C. source (disconnected) is represented with a rectified bridge connected to a capacitor for storing a D.C. voltage and an A.C. voltage is applied to the stator winding.

As seen in FIG. 1, secondary or brake winding 40 is wound in parallel with winding 30 with their respective flux fields adding to each other in the preferred embodiment also adding the resulting torque. Brake winding 40 has a considerable higher resistance than the resistance of winding 30. Winding 40 has contacts 42 and 44. Direct current (DC) source 60 has positive terminal 62 and negative terminal 64. Source 60 can be implemented with a separate D.C. power supply, a battery or obtained from A.C. source 80 after being rectified and capacitor 68 charged through limiting resistor 69. The value of capacitor 68 is such that it holds sufficient electricity to effectively brakes rotor 35. Positive terminal 62 is selectively connected through switch 110 to contact 42 and in tandem connection of terminal 64 and contact 42, as shown in FIG. 2. Since the application of D.C. source 60 should not occur at the same time A.C. source 80 is driving the motor, switch 120 controlling the application of A.C. voltage is designed to brake before the connection of switch 110 is made. If a D.C. voltage is maintained while the A.C. voltage is applied, the rotor is slowed down. This may be a way for controlling the torque of the motor.

Figure 3:
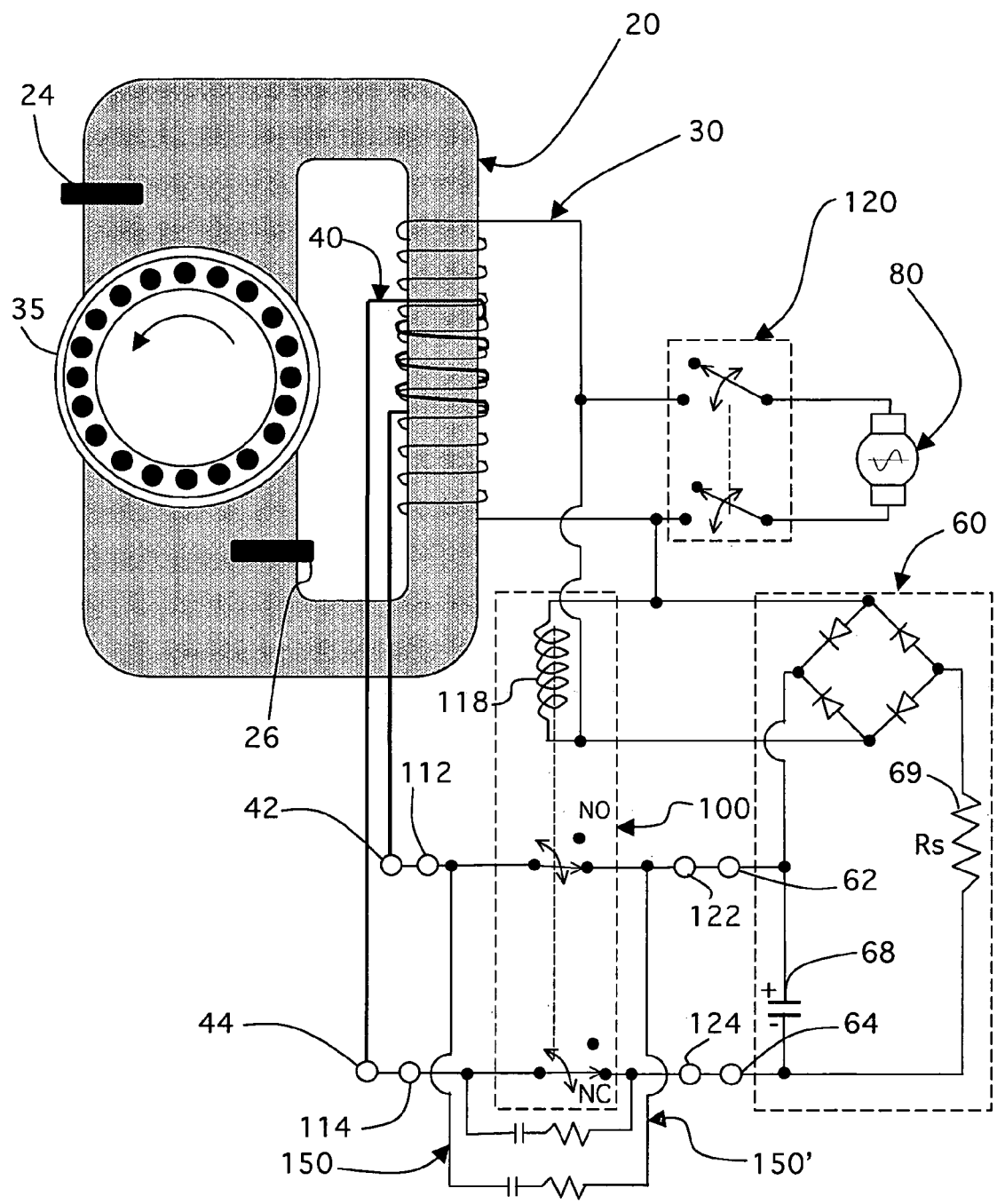
FIG. 3 shows the embodiment shown in FIG. 2 where the D.C. brake voltage stored capacitor connected to the rectified A.C. voltage is applied to the brake winding causing the rotor to stop.

As shown in FIG. 3, pole contact 112 of switch member 110 is electrically connected to contact 42 of secondary or brake winding 40. Contact 114 is connected to contact 44, when switch 110 is closed, the connection between contact 112 (and 114) with contact 62 (and 64) is made applying the voltage in capacitor 68 to brake winding 40. Switch 110 is driven with relay coil 118 opening the connection between contacts 112; 114 with 122; 124 when A.C. source 80 is present. During this time, capacitor 68 is charged through resistor 69. Once A.C. source 80 is removed as shown in FIG. 3, coil 118 is deactivated and switch 110 is closed applying the voltage in capacitor 68 across brake winding 40.

Figure 4:
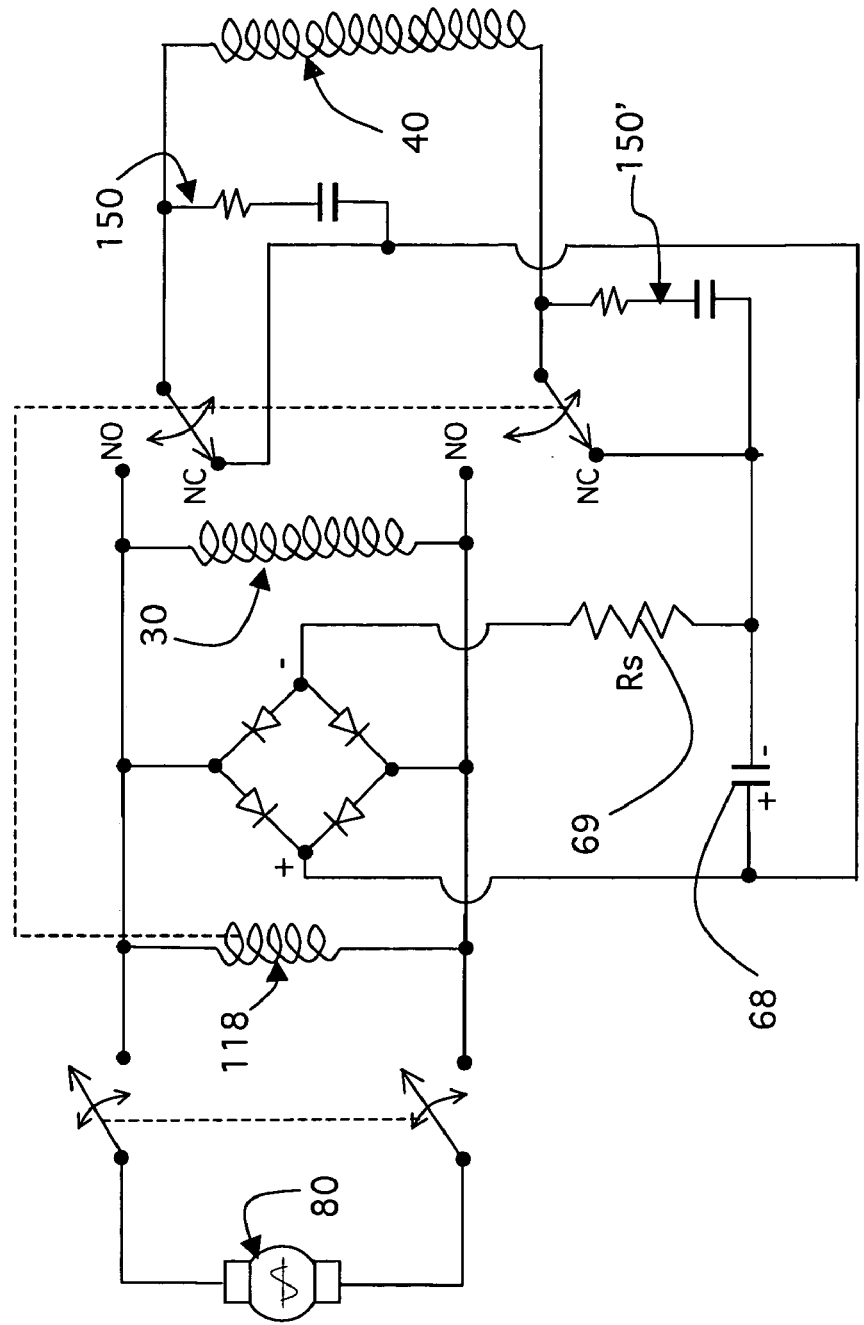
FIG. 4 illustrates another embodiment where the brake winding is connected in parallel (adding fields) to the stator winding when the motor is running and the A.C. source is connected.

Another embodiment is shown in FIG. 4 wherein winding 40 is connected in parallel with winding 30 when A.C. voltage source 80 is disconnected. This causes the voltage in capacitor 68 to be applied to both, station winding 30 and brake winding 40 connected in parallel with their respective magnetic fields adding each other.

Arc suppressing circuits 150 and 150' are connected between contacts 112 and 122 as well as 114 and 124, respectively. They are intended to reduce the arcing produced when the relay switch 110 first picks when the D.C. voltage is first applied. There is also considerable energy induced from stator winding 30 into brake winding 40. When switch 110 starts to open, the gap is small requiring a relatively small voltage to start arcing and continues arcing until the induced A.C. voltage passes through zero. Solid-state devices can obviate these arcing problems with the consequent added costs.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A shaded pole A.C. motor, comprising:
A) a stator assembly including a core having two shaded coils and a stator winding wound around said core and said stator winding being connected to an A.C. power source;
B) a brake winding having a higher resistance than said stator winding and said brake winding wound around said core;
C) a D.C. power source being able to connect/switch to said brake winding; and
D) switch means for selectively interrupting the connection between said A.C. power source and said stator winding and between said D.C. source means and said brake winding.

2. The motor set forth in claim 1 further including means for preventing the connection of said A.C. and D.C. power sources simultaneously.

3. The motor set forth in claim 2 wherein said switch means connect said stator and brake windings in parallel when said A.C. power source is connected to said stator winding.

4. The motor set forth in claim 3 wherein said switch means connect said stator and brake windings in series when said D.C. power source connection is not interrupted.

5. The motor set forth in claim 3 further including:
F) arc suppressing means connected in parallel to said switch means.

6. The motor set forth in claim 5 wherein said switch means includes activating relay coil means for opening and closing the connection.

7. The motor set forth in claim 6 wherein said D.C. source means includes a rectifier bridge having first and second A.C. input contacts selectively connected through said switch means to said A.C. power source and first and second D.C. output contacts selectively connected through said switch means to said brake winding, said D.C. source means further including capacitor means connected between said first and second D.C. output contacts and selectively connected through said switch means to said brake winding.

* * * * *